Oct. 18, 1960  R. W. BRANDT  2,957,066
ELECTRONIC TEMPERATURE REGULATION FOR VULCANIZING TIRES
Filed June 20, 1957 2 Sheets-Sheet 1
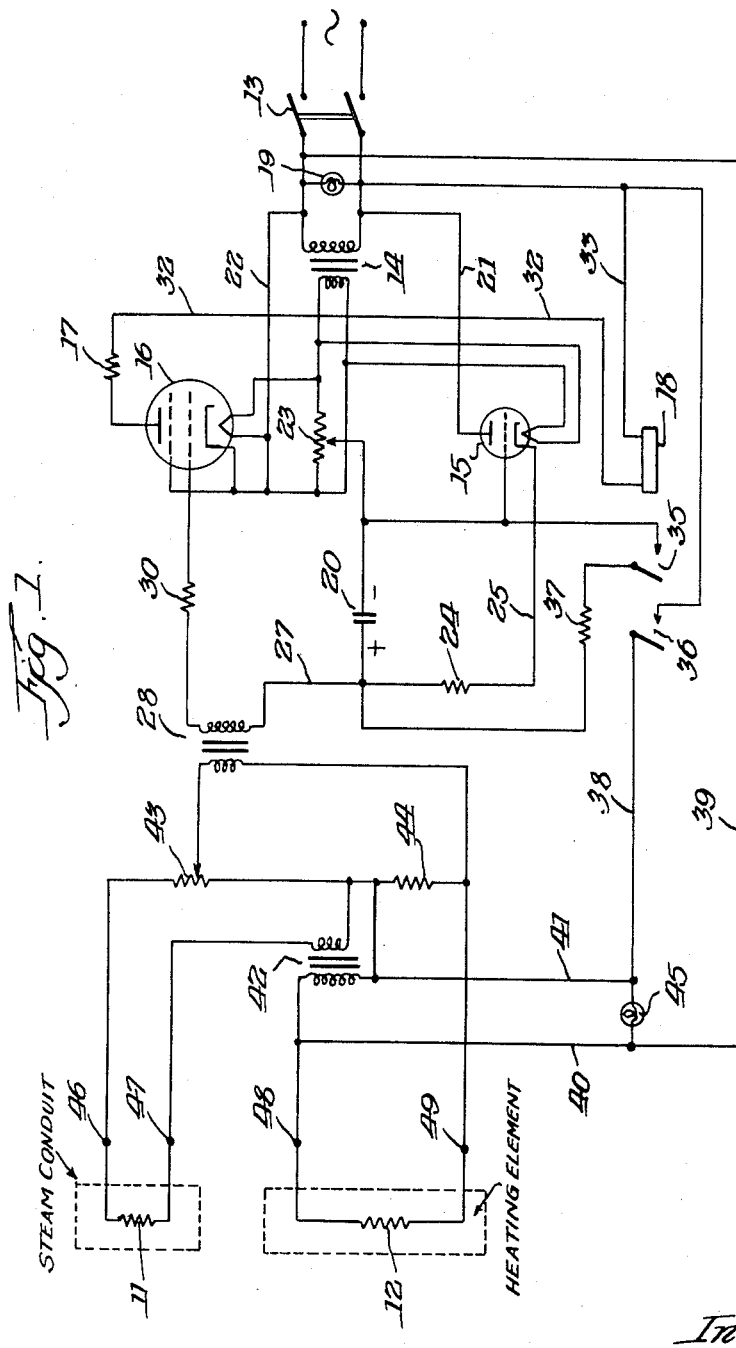
Fig. 1
Inventor.
Raymond W. Brandt.
By
Atty.

Oct. 18, 1960 R. W. BRANDT 2,957,066
ELECTRONIC TEMPERATURE REGULATION FOR VULCANIZING TIRES
Filed June 20, 1957 2 Sheets-Sheet 2
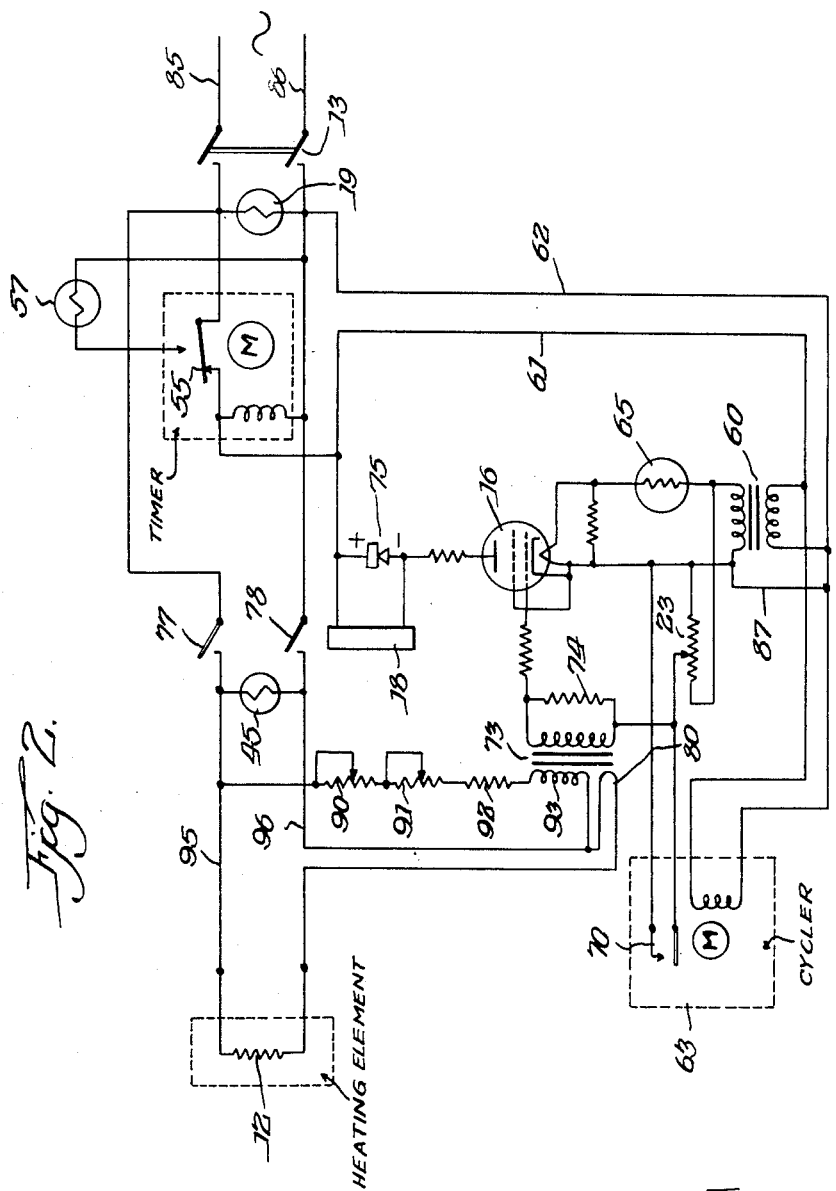
Fig. 2.
Inventor.
Raymond W. Brandt.
By 
Atty.

United States Patent Office 2,957,066
Patented Oct. 18, 1960

2,957,066

ELECTRONIC TEMPERATURE REGULATION FOR VULCANIZING TIRES

Raymond W. Brandt, Janesville, Wis., assignor, by mesne assignments, to The Goodyear Tire & Rubber Company, a corporation of Ohio Filed June 20, 1957, Ser. No. 666,999

19 Claims. (Cl. 219—20)

This invention relates to the art of vulcanizing and is particularly concerned with a system for regulating and controlling the temperature of the heat applied in vulcanizing a rubber body to a carrier therefor, for example, in vulcanizing a retread to a tire casing. The invention may be considered in the nature of an improvement on the system disclosed in copending application Serial No. 665,795, filed June 14, 1957.

The system of the copending application applies heat, for example, heat generated in customary manner by steam, to the tread-forming matrix of a retread mold, for transfer radially inwardly to and through a band of new rubber, referred to as camelback, placed upon a tire casing to be retreaded, and heat generated by an electrical heating element disposed inside the tire casing, for transfer, radially outwardly to the interface or bonding area between the camel back and the stripped crown of the tire casing. The electrical heating element which may be made in accordance with the disclosure of copending application Serial No. 640,387, filed February 15, 1957, is an endless circular band in which are embedded turns of wire forming a heating coil.

The coil wire is made of a material that changes its electrical resistance with increase of temperature, for example so-called Balco wire, the electrical resistance of which increases with increasing temperature. This thermally dependent resistance characteristic is in connection with the heating coil wire important because it provides a safety feature permitting rapid heating of the heating element without danger of overheating and deteriorating the rubber surrounding the heating wire.

Another Balco wire may be disposed in the heating element of the copending application, as an integral part thereof, forming a resistor sensing the temperature developed by the heating element. A similar sensing resistor is disposed in a suitable and desired steam conduit. The sensing resistors are connected in an evaluating circuit as arms of a Wheatstone bridge and, having a thermally dependent resistance characteristic, transmit to a thyratron tube voltage signals denoting any temperature differential existing between the heat respectively generated by the steam and the electrical heating element. If the electrical criteria produced by both sensing resistors are substantially identical, the thyratron will remain at cutoff; however, if the sensing resistor in the electrical heating element produces an electrical criterion (voltage) differing from that sensed by the sensing resistor in the steam conduit, indicating that the temperatures of the heat produced by the respective heating media are different, for example, that the temperature of the heat developed by the electrical heating element is lower than that of the heat produced by the steam, the thyratron will become conductive and operate a relay to connect current to the heating coil of the heating element. The current applied to the heating coil increases the temperature of the heat produced inside the tire, the sensing operation of the sensing resistors continuing until the balance of the bridge is restored, when the thyratron disconnects the relay to effect disconnection of current to the heating coil.

The interplay between the bridge formed by the sensing resistors and the thyratron continues for the duration of the vulcanizing or curing operation, producing heat inside the tire casing at a desired temperature while heat, for example, of the same temperature is applied to the retread from the steam-heated tread-forming matrix. The prior system also includes means for adjustably setting the operation to produce inside of the tire casing heat of predetermined temperature, for example, a temperature exceeding the temperature of the heat applied by the steam-heated matrix; means for signalling the "On" condition of the vulcanizing operation; means for signalling the supply of current to the electrical heating element; and means for timing the duration of the vulcanizing and curing operation and for signalling the completion thereof.

One object of the present invention is to provide an evaluation circuit employing the heating coil disposed in the electrical heating element as a heating and also as a temperature sensing element cooperating with a temperature sensing resistor disposed in a steam conduit.

Another object is to provide an evaluating circuit employing, for the control and regulation of the temperature, electrical criteria produced by the heating coil, which are compared with an electrical criterion produced by a standard resistor disposed in the evaluating circuit.

These and other objects and features of the invention will appear from the description of two embodiments which is rendered below with reference to the accompanying drawings.

Fig. 1 shows a heat control and regulation system employing temperature sensing resistor means in a steam conduit and using the heating coil embedded in the electrical heating element for the dual purpose of producing heat and of producing electrical current criteria which are utilized for comparison with a criterion derived from the sensing resistor; and Fig. 2 shows an embodiment in which all individual sensing resistor elements are eliminated, those in the electrical heating element as well as those in the steam conduit, employing for the temperature control and regulation merely electrical current criteria derived respectively from the heating wire of the heating element and from a standard resistor included in the evaluating circuit.

The structure and cooperation of parts will appear from the following description of the operation of the two embodiments.

Referring now to Fig. 1, it is assumed that temperature sensing resistor 11 is disposed in a suitable steam conduit supplying heat to a tread-forming matrix surrounding the retread or camelback of a tire to be retreaded. Numeral 12 indicates the wire of the heating coil embedded in the electrical heating element disposed inside of the corresponding tire casing.

Whatever the temperature of the parts at the start of the operation may be is wholly immaterial; all parts may be at room temperature or, for example, the mold parts including the tread-forming matrix, may be at elevated temperature after a preceding retread operation, and the heating element inside of the tire to be retreaded may be at room temperature.

After the parts are assembled and placed in the molding machine, as described in copending application Serial No. 665,795, the switch 13 is operated to connect the step-down transformer 14 to current from a suitable source, for example, a commercial current source, which may be alternating current of 110 v., 60 cycles. The secondary winding of transformer 14 supplies current, for example at 6 v., to the heating filament of a triode 15 which operates in the nature of a rectifier, and to the heating filament of a thyratron 16 having in the plate circuit a resistor 17 and the winding of a relay 18. Numeral 19 indicates a pilot lamp which signals the "On" condition of the system.

Upon heating up, the triode 15 passes current to charge the capacitor 20 in an RC circuit including the resistor 24, the charging circuit extending from the plate of the triode, conductor 21, primary winding of transformer 14, conductor 22, potentiometer 23, capacitor 20, resistor 24, and conductor 25 back to the triode. The function of the potentiometer 23 is to adjust the bias for the thyratron 16. The capacitor charge current fires the thyratron 16 in a circuit extending over conductor 27, primary winding of a coupling transformer 28, and resistor 30 to a control grid thereof, making the thyratron conductive according to the time constant of the RC element.

Relay 18 energizes now in a circuit extending from one terminal of the commercial current source, conductor 22 to the thyratron and from the plate of the thyratron, resistor 17, conductor 32, winding of relay 18, conductor 33, to the other terminal of the current source. Relay 18, upon energizing, actuates its contacts 35 and 36. Contact 35 shunts the RC elements 20 and 24 over a resistor 37 and the capacitor discharges. Current from the commercial current source is now connected over conductors 38, 39 and 40, 41 to a current bridge, as distinguished from a voltage bridge, comprising the sensing resistor 11 in the steam conduit, the heating (resistor) coil 12 of the electrical heating element inside the tire to be retreaded, a step-down transformer 42, a potentiometer resistor 43, and a resistor 44.

Numeral 45 indicates a signal lamp connected across conductors 38, 39 to indicate that current is being supplied to the coil 12 of the heating element, in other words, that the tire casing to be retreaded is being heated from the inside while heat is transferred to the camelback from the steam-heated tread-forming matrix surrounding the camelback. The dots 46, 47 and 48, 49 indicate terminals of plugs and sockets for removably connecting the bridge elements 11 and 12 to the system.

The thyratron 16 which controls the operation of the relay 18 and therewith the supply of current to the coil 12 of the heating element inside the tire, must cut off and restore the relay 18 to disconnect current from the coil 12 and also from the sensing resistor 11, at a time when the temperature generated by the heating element inside the tire is at a predetermined magnitude, for example, a temperature corresponding to that generated by the steam; conversely, the thyratron must continue to pass current so as to keep the relay 18 energized and current on the bridge and the electrical heating element, at a time when the temperature generated inside the tire differs from the predetermined value, for example, at a time when the inside tire temperature is lower than that generated by the steam.

The temperature desired inside the tire casing is determined by the potentiometer 43 which is affected by current from the secondary winding of the step-down transformer 42, in a circuit extending over the steam temperature sensing resistor 11. The resistor 44 is disposed in a circuit including the heating coil 12 and the primary winding of the transformer 42. Both elements, the sensing resistor 11 and the heating coil 12 are made of material having a thermally dependent resistance characteristic, for example, Balco wire which increases the resistance with increasing temperature. The current flowing respectively through resistors 43 and 44 is accordingly a criterion for the electrical resistance of these elements and, therefore, a criterion for the temperature of the heat respectively sensed (resistor 11) and produced (coil 12) thereby. The current flowing through potentiometer resistor 43 may be termed a standard temperature criterion which is being compared with the current flowing through the resistor 44 constituting a variable temperature criterion.

To give an example, it shall be assumed that the potentiometer 43 has been set for a temperature 296° F. to be generated by the coil 12 of the heating element disposed inside the tire. Current of a certain magnitude—the standard temperature criterion—will flow through the potentiometer resistor 43. If it is further assumed that the heating coil 12 is, for example, at the start of a retread operation at room temperature, the resistance of the Balco wire coil will be relatively low, current of higher value will initially flow through the coil and, if maintained on the coil, will rapidly heat the inside of the tire casing, and the resistance of the heating coil will gradually increase with increasing temperature. Having assumed that the temperature of the heating element is initially lower than that affecting the sensing resistor 11, current will initially flow through the resistor 44 which is of a higher value than the current flowing through resistor 43, and the primary winding of the coupling transformer 28 will receive during the positive half-cycles current signals which are stepped up to deliver at the secondary winding bias current for maintaining the thyratron conductive and, therefore, maintaining the relay 18 energized to continue supply of current to the heating element inside the tire casing.

When the temperature inside the tire casing (electrical heating element) reaches the desired predetermined temperature set by the potentiometer 43, the current flowing through 43 and 44 will cancel each other and produce a balance condition with no bias or control current transmitted to the thyratron 16. The latter extinguishes, causing relay 18 to restore and to disconnect current from the bridge by opening contact 36, and opening contact 35 to remove the shunt from the RC element comprising the capacitor 20 and resistor 24.

The above described operations are repeated for the duration of the curing and vulcanizing whenever the bridge recognizes a temperature differential existing between the heat of the two sources applied to the tire.

A device for timing the duration of the vulcanizing or curing operation may be incorporated in the system of Fig. 1 in a similar manner as will be described in connection with Fig. 2.

The system according to Fig. 2 is based on recognition and full utilization of the thermally dependent resistance characteristic of the Balco wire forming the heating coil 12 disposed in the heating element inside the tire casing to be retreaded, and further recognition of the fact that it is for the heat control and regulation sufficient to provide standard resistor means in the evaluating circuit which furnishes an electrical criterion for comparison with the electrical criteria derived from the heating coil. The sensing resistor 11 in the system shown in Fig. 1 has accordingly been eliminated and replaced by potentiometer resistor means in the evaluating circuit. The corresponding potentiometer means may be set to provide conditions in accordance with desired temperatures to be produced by the heating element inside the tire casing.

In Fig. 2, some of the parts which correspond to similar parts incorporated in Fig. 1 are similarly marked. These parts include the main switch 13, the lamp 19 which indicates the "On" condition of the system, the relay 18 which connects current to the coil 12 of the electrical heating element, the lamp 45 which signals that current is being supplied to the coil 12, the thyratron 16 which governs the actuation of the relay 18, and the potentiometer 23 for adjusting the bias for the control grids of the thyratron.

Assuming now again that the electrical heating element having the coil 12 is at the start of the operation at a temperature lower than that of the steam applied to heat the tread-forming matrix surrounding the camelback, the operation will be as follows:

Upon closing the switch 13, current will be connected, over conductors 85, 86 to the pilot lamp 19, as in Fig. 1, to signal that the system is in operation. Current will also be connected to the motor M of a timer which controls a contact 55, keeping such contact closed for a predetermined time required for completing the retread operation, and opening the contact upon completion thereof to disconnect current from the evaluating circuit of the system, at the same time closing a circuit for a lamp 57 to signal the completion of the retreading operation. The corresponding time interval is experimentally determined by measurements taken in retreading tires and may, of course, be different according to the tires being processed for retreading.

Current from a desired source, for example, a commercial 110 v., 60 cycle source is also connected to the primary winding of a transformer 60 and to the motor M of a cycling device 63 (cycler) which controls a contact 70, the circuit to the current source extending over conductors 61, 62 and timer contact 55. The function of the cycling device will be presently explained.

The secondary winding of the transformer 60 supplies current to the heating element of the thyratron 16 in a circuit including an amperite ballast tube 65. The function of this ballast tube is to hold the current and voltage supplied to the thyratron 16 constant.

A circuit is at the same time completed to connect during the half-cycles of the current source bias current to a control grid of the thyratron 16 by way of the potentiometer 23 and the secondary winding of coupling transformer 73 in parallel with a resistor 74. The purpose of the potentiometer 23 is to adjust the proper bias for the thyratron.

The thyratron, after heating up in the circuit including the ballast tube 65 fires and causes operation of the relay 18 in a circuit to the commercial current source, the circuit extending from the plate of the thyratron, winding of relay 18 in parallel with a rectifier 75, timer contact 55, conductor 85, and back to the thyratron over conductors 86, 62 and 87.

Relay 18 accordingly operates and closes contacts 77, 78, thereby connecting commercial current, over conductors 95, 96, to the heating coil 12 in an obvious circuit including the primary winding 80 of the coupling transformer 73. The lamp 45, connected across conductors 95, 96, extending from the contacts 77, 78 of the relay 18, indicates that current is being supplied to the heating element disposed inside of the tire casing being retreaded; in other words, the lamp 45 indicates that the tire casing to be retreaded is being heated on the inside.

It has been assumed that the tire casing is at the start of the operation at a temperature lower than that of the steam-heated tread-forming matrix of the molding machine. It will accordingly be necessary to maintain the supply of current to the heating coil 12 for an interval until the heat inside the tire casing is at a predetermined temperature, for example, at a temperature corresponding to that of the steam-heated matrix.

The desired temperature is set by means of potentiometer resistors 90 and 91 disposed in series with a resistor 92 and a primary winding 93 of the coupling transformer 73. Two potentiometers, 90, 91 have been shown to provide for greater latitude in setting the system to produce inside the tire casing a predetermined desired temperature; one may be used if desired. The potentiometer resistors 90, 91 and the resistor 92 connected in series therewith constitute the standard resistor element which furnishes at the primary winding 93 of the coupling transformer 73 a standard electrical citerion for comparison with electrical criteria derived from the heating coil 12 and appearing at the primary winding 80 of the coupling transformer. The standard electrical criterion is derived directly from the commercial current source; the elements 90, 91, 92 and 93 are for this purpose connected across the conductors 95, 96 extending to the commercial current source by way of the relay contacts 77, 78 and the main switch 13. The elements 90, 91, 92, 93 and 80 form in effect arms of a current bridge.

The electrical criterion appearing on the primary winding 80 of the coupling transformer 73 is indicative of the temperature prevailing inside the tire casing and, if the current represented by this criterion, induced to the secondary winding of the coupling transformer differs from that of the current appearing on the primary winding 93, likewise induced to the secondary winding, as it will differ so long as the temperature inside the tire casing differs from the predetermined temperature, bias current will flow in a circuit including conductor 87, bias potentiometer 23, secondary winding of the coupling transformer 73, to a control grid of the thyratron, maintaining the thyratron conductive and, accordingly, maintaining the relay 18 operated and current connected to the heating coil 12.

When the temperature inside the tire casing increases to a value corresponding to the predetermined desired temperature, due to continued heating of the coil 12, the current appearing at the primary windings 80 and 93 will be alike, the bridge will be balanced, and no bias current will be supplied to the thyratron. The latter extinguishes, restoring the relay 18 to normal. Contacts 77, 78 controlled by relay 18 are opened and commercial current is accordingly disconnected from the heating coil 12 and from the current bridge.

In the system described with reference to Fig. 1, the thyratron is fired by bias current from the charge of an RC element having a time constant which introduces a certain delay. The relay 18, upon operating under control of the thyratron shunts the RC element, thereby discharging the capacitor. The thyratron thereupon depends for continued operation on bias current supplied by the corresponding current bridge. The operation is accordingly continuously cycled, that is, checked and supervised, to establish the need for the supply of current to the heating element inside the tire casing.

In the system shown in Fig. 2, this cycling is accomplished by means of the cycling device 63 controlling contact 70 and providing for cycling recurring, for example, in 30 second intervals. The cycling device is started upon starting the retreading operation, intermittently actuating contact 70 twice per minute, thereby shunting the bias potentiometer 23. If the bridge comprising the elements 90—93 and 80 recognizes the need for continued heating, the thyratron 16 will receive bias current from the coupling transformer 73 as described. The cycling will continue and the thyratron will be maintained operated for the duration of the unbalance of the bridge. However, if the bridge becomes balanced during a cycling interval, indicating that the temperature inside of the tire casing corresponds to the predetermined temperature, no bias current will be transmitted from the bridge and the thyratron will extinguish, causing disconnection of the bridge and therewith disconnection of current from the heating element 12.

A suitable tube may be used in place of the cycling device shown.

The invention has been developed specifically for control and regulating the heat applied to tire casing in the retreading thereof. However, some or all of the salient features disclosed herein may be useful and applicable in other or in related fields.

Changes may be made within the scope and spirit of the appended claims.

I claim:

1. In a system for vulcanizing a rubber body to a carrier therefor, comprising first and second heating means for respectively generating heat and for imparting such heat to said body respectively from the side thereof which faces away from said carrier and to the carrier from the side thereof which faces away from said body, a device for controlling the application of heat from one of said heating means, said device comprising an evaluating circuit, control means in said evaluating circuit cooperatively connected with at least one of said heating means for producing electrical criteria indicating the magnitude of the temperature produced by the heat generated by the corresponding heating means, operating means governed by said control means for supplying heat-generating energy to the corresponding heating means until the electrical criteria produced by said control means indicate a predetermined desired temperature generated by such heating means, and means for cyclically controlling the operation of said operating means.

2. A system and cooperation of parts according to claim 1, wherein said body is a band of rubber carried by a pneumatic tire casing to form after vulcanizing a tread thereon.

3. A system and cooperation of parts according to claim 2, comprising a discharge tube constituting said operating means, switching means controlled by said tube, and means governed by said switching means for controlling the supply of heat-generating energy to said heating means.

4. A system and cooperation of parts according to claim 3, comprising means for setting said evaluating circuit to produce heat of a predetermined desired temperature by said heating means.

5. A system and cooperation of parts according to claim 4, comprising a potentiometer constituting said setting means, said potentiometer supplying an electrical standard criterion for comparison with the electrical criteria produced by said control means.

6. A system and cooperation of parts according to claim 5, comprising a sensing element cooperatively connected with the second heating means and operatively interconnected with said potentiometer to produce said standard criterion.

7. A system and cooperation of parts according to claim 5, comprising a current source for supplying heat-generating energy to said heating means, and means for connecting said potentiometer with said current source.

8. A system and cooperation of parts according to claim 5, comprising an RC element cooperatively connected with said switching means and constituting said cycling means.

9. A system and cooperation of parts according to claim 5, comprising a motor-controlled device constituting said cycling means.

10. A system and cooperation of parts according to claim 5, comprising bias means for said discharge tube, and means controlled by said cycling device for intermittently shunting said bias means.

11. In the art of retreading pneumatic tire casings by application of steam-generated heat to the camelback which is to form the retread and simultaneous application of heat generated by heating coil means carried by an electrical heating element disposed inside a tire casing being retreaded, apparatus for controlling and regulating the heat generated by said electrical heating element, said apparatus comprising a current source, switching means connected to said current source for operatively connecting current from such source to the coil of said heating element, means for producing for the duration of the retread operation an electrical standard measuring criterion, means electrically coupled to said electrical heating element and for producing for the duration of the retread operation successive electrical measuring criteria derived from said electrical heating element and indicative of the momentarily prevailing temperature produced by the heat generated thereby, control means for successively comparing said criteria with said standard criterion, and means governed by said control means for controlling the actuation of said switching means to connect current from said current source to the heating coil of said electrical heating element only in response to criteria derived therefrom indicating predetermined deviation from said standard criteria.

12. Apparatus according to claim 11, wherein said electrical heating coil means is made of material having a thermally dependent resistance characteristic.

13. Apparatus according to claim 12, comprising potentiometer means directly controlled by current from said current source for producing said standard electrical criterion.

14. Apparatus according to claim 13, comprising resistor means disposed in series relation with said electrical heating coil for producing said electrical criteria.

15. Apparatus according to claim 12, comprising resistor sensing means cooperating with said steam-generated heat source, potentiometer means in series relationship with said sensing resistor means, and resistor means disposed in series relation with said electrical heating coil for producing said electrical criteria.

16. Apparatus according to claim 13, comprising an electronic discharge device forming part of said switching means.

17. Apparatus according to claim 16, comprising means for periodically connecting said discharge device for operation.

18. Apparatus according to claim 17, comprising means for timing the retread operation.

19. Apparatus according to claim 18, comprising signal means for respectively indicating operative connection of said switching means and operative actuation of said electrical heating element.

References Cited in the file of this patent

UNITED STATES PATENTS

| | | |
|---|---|---|
| 2,600,313 | Mershon | June 10, 1952 |
| 2,805,311 | Fluegel et al. | Sept. 3, 1957 |
| 2,808,496 | Van Gorcum | Oct. 1, 1957 |